(12) United States Patent
Sugita et al.

(10) Patent No.: US 6,436,201 B1
(45) Date of Patent: Aug. 20, 2002

(54) CATIONIC ELECTRODEPOSITION PAINT COMPOSITION

(75) Inventors: Masaru Sugita; Katsuhisa Sugisaki, both of Hiratsuka (JP)

(73) Assignee: Kansai Paint Co., Ltd., Hyogo (JP)

(*) Notice: Subject to any disclaimer, the term of this patent is extended or adjusted under 35 U.S.C. 154(b) by 0 days.

(21) Appl. No.: 09/601,221

(22) PCT Filed: Jan. 28, 1999

(86) PCT No.: PCT/JP99/00354

§ 371 (c)(1),
(2), (4) Date: Jul. 28, 2000

(87) PCT Pub. No.: WO99/38923

PCT Pub. Date: Aug. 5, 1999

(30) Foreign Application Priority Data

Jan. 29, 1998 (JP) .......................................... 10-017255
Mar. 6, 1998 (JP) .......................................... 10-054972

(51) Int. Cl.⁷ .............................................. C23C 22/00
(52) U.S. Cl. ...................... 148/241; 148/273; 204/489; 428/457
(58) Field of Search ............................... 148/241, 273; 204/489; 428/457

(56) References Cited

U.S. PATENT DOCUMENTS 5,330,839 A * 7/1994 Yasuoka et al. ............ 428/413
5,753,726 A * 5/1998 Reuter et al. ............... 523/405

FOREIGN PATENT DOCUMENTS

| JP | 60-28468 | 2/1985 |
| JP | 5-239386 | 9/1993 |
| JP | 6-248203 | 9/1994 |
| JP | 7-506870 | 7/1995 |
| JP | 8-60046 | 3/1996 |

* cited by examiner

Primary Examiner—John Sheehan
Assistant Examiner—Andrew L. Oltmans
(74) Attorney, Agent, or Firm—Wenderoth, Lind & Ponack, LLP

(57) ABSTRACT

Disclosed is a cationic electrodeposition coating composition comprising (A) a resin for cationic electrodeposition coatings, (B) a compound containing a metal selected from among bismuth, lanthanum and molybdenum, and (c) a metal hydroxide represented by the following formula:

$$M_{(1-x)}Al_x(OH)_{(2+x)} \cdot mH_2O$$

wherein M is Mg or Zn, and x and m are values satisfying the relationships: $0 \leq x \leq 1$ and $0 \leq m < 2$. This cationic electrodeposition coating composition can form a coating film which exhibits an excellent rust-proofing effect on untreated steel plates or sheets and has good smoothness, without using harmful substances such as lead compounds and chromium compounds.

17 Claims, No Drawings

CATIONIC ELECTRODEPOSITION PAINT COMPOSITION

TECHNICAL FIELD

This invention relates to a cationic electrodeposition coating composition capable of forming a coating film which exhibits an excellent rust-proofing effect on untreated steel plates or sheets and has good smoothness, without using harmful substances such as lead compounds and chromium compounds.

BACKGROUND ART

Since cationic electrodeposition coatings exhibit excellent throwing power and can form a coating film having excellent properties such as durability and anticorrosive power, they are being widely used as undercoatings for automobile bodies, electrical appliances and other articles which require such properties.

In order to maintain the anticorrosive power of the coating film, these electrodeposition coatings may contain lead compounds and chromium compounds such as lead chromate, basic lead silicate and strontium chromate. However, these compounds are very harmful substances and their use involves problems from the viewpoint of environmental protection. For this reason, it has been proposed to use, in place of these harmful substances, nontoxic or less toxic compounds such as zinc phosphate, iron phosphate, aluminum phosphate, calcium phosphate, zinc molybdate, calcium molybdate, zinc oxide, iron oxide, aluminum phosphomolybdate and zinc phosphomolybdate (see, for example, Japanese Patent Publication No. 7224/'91). However, as compared with the aforesaid electrodeposition coatings containing a lead or chromium compound, such electrodeposition coatings have poor anticorrosive power and are hence unsatisfactory from a practical point of view.

Moreover, Japanese Patent Laid-Open No. 136303/'94 suggests a cationic electrodeposition coating comprising a resin composition obtained by reacting an epoxy resin with a compound having a P—OH, S—H or 3,4,5-trihydroxyphenyl group and further reacting the resulting prepolymer with a compound having an amino group capable of reacting with the epoxy group, and hydrotalcite (a mineral comprising a hydrated basic carbonate of magnesium and aluminum). However, this cationic electrodeposition coating fails to form a coating film having satisfactory anticorrosive power.

Furthermore, a coating film formed by applying a cationic electrodeposition coating containing no lead compound or chromium compound to untreated cold-rolled steel plates or sheets (which have not been subjected to a chemical conversion treatment with zinc phosphate or the like) has poor anticorrosive power. Moreover, in order to cure this coating film, it must be heated to a temperature of about 170 to about 180° C. Within the heating oven, however, some parts of the coating film may reach temperatures above 200° C. It is pointed out that this causes the problem of reducing the anticorrosive power and adhesion of those parts of the coating film which have been exposed to such high temperatures.

An object of the present invention is to provide a cationic electrodeposition coating capable of forming a coating film which exhibits an excellent rust-proofing effect even on untreated steel plates or sheets, shows no reduction in anticorrosive power or adhesion even if exposed to temperatures above 200° C., and has good smoothness, without using harmful substances such as lead compounds and chromium compounds.

It has now been found that this object can be accomplished by combining a resin for cationic electrodeposition coatings with a compound containing a specific metal and a metal hydroxide having a specific composition. The present invention has been completed on the basis of this finding.

DISCLOSURE OF THE INVENTION

Thus, the present invention provides a cationic electrodeposition coating composition comprising (A) a resin for cationic electrodeposition, (B) a compound containing a metal selected from among bismuth, lanthanum and molybdenum, (c) a metal hydroxide represented by the following formula:

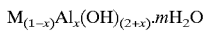

$$M_{(1-x)}Al_x(OH)_{(2+x)} \cdot mH_2O$$

wherein M is Mg or Zn, and x and m are values satisfying the relationships: $0 \leq x \leq 1$ and $0 \leq m < 2$.

EMBODIMENTS OF THE INVENTION

The cationic electrodeposition coating composition of the present invention will be more specifically described hereinbelow.

Resin for Cationic Electrodeposition (A)

As the resin for cationic electrodeposition (A) contained in the coating composition of the present invention, the may be used, for example, a common resin which has a crosslinking functional group (e.g., the hydroxyl group) and a cationic group, and is suitable for use in cationic electrodeposition coatings. The skeleton of the resin may comprises any resin selected from among epoxy resins, acrylic resins, polybutadiene, alkyd resins, polyester resins and the like. However, in order to improve the anticorrosive properties of the coating film, it is generally preferable to use a polyamine resin formed by the addition of an amine to an epoxy resin (i.e., an amine-added epoxy resin).

Examples of the amine-added epoxy resin include (i) the adduct of a polyepoxide compound with a primary mono- or polyamine, a secondary mono- or polyamine, a mixed primary and secondary polyamine, or the like (see, for example, U.S. Pat. No. 3,984,299); (ii) the adduct of a polyepoxide compound with a secondary mono- or polyamine having a ketiminized primary amino group (see, for example, U.S. Pat. No. 4,017,438); and (iii) the reaction product obtained by the etherification of a polyepoxide compound with a hydroxyl compound having a ketiminized primary amino group (see, for example, Japanese Patent Laid-Open No. 43013/'84).

The polyepoxide compound used for the preparation of the aforesaid amine-added epoxy resins is a compound having two or more epoxy groups in the molecule. Suitable polyepoxide compounds generally have a number-average molecular weight of at least 200, preferably 400 to 4,000, and more 800 to 2,000. Among others, polyepoxide compounds formed by the reaction of a polyphenol compound with epichlorohydrin are preferred. The polyphenol compound which can be used for the formation of such polyepoxide compounds include, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl sulfone, phenolic novolac and cresylic novolac.

The polyepoxide compounds may further be partially reacted with a polyol, polyether polyol, polyester polyol, polyamideamine, polycarboxylic acid, polyisocyanate compound or the like. Moreover, the polyepoxide compounds onto which ε-caprolactone, an acrylic monomer or the like has been graft-polymerized may also be used.

The above-described base resins may be either of the external crosslinking type or of the internal (self-)crosslinking type. The base resins of the external crosslinking type are used in combination with a curing agent. As the curing agent, there may be used any of the conventionally known crosslinking agents such as polyisocyanate compounds which may be blocked, and amino resins. Among other, blocked polyisocyanate compounds are preferred. The base resins of the internal (self-)crosslinking type are resins which can be crosslinked and cured by themselves without the aid of a curing agent. Examples thereof include resins which are obtained by reacting a partially blocked polyisocyanate compound with a base resin, and hence have both an active hydrogen-containing functional group and a blocked isocyanate group in the same molecule.

The blocked polyisocyanate compounds which can be used in combination with the base resins of the external crosslinking type are the fully blocked addition products of polyisocyanate compounds. The polyisocyanate compounds are compounds having two or more isocyanate groups in the molecule. Examples thereof include aromatic, alicyclic and aliphatic polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate and isophorone diisocyanate; and isocyanate-terminated prepolymers obtained by reacting an excessive amount of any of the foregoing polyisocyanate compounds with a low-molecular active hydrogen-containing compound such as ethylene glycol, propylene glycol, trimethylolpropane, hexanetriol or castor oil.

The isocyanate groups of the aforesaid polyisocyanate compounds are blocked by the addition of a blocking agent, and the blocked polyisocyanate compounds formed by its addition are stable at ordinary temperatures. When they are heated to a temperature higher than the dissociation temperature (e.g., 100° C. or above), the blocking agent is dissociated to regenerate the isocyanate groups, which then undergo a crosslinking reaction with the base resin. The blocking agents which can be used for this purpose include, for example, lactam compounds such as ε-caprolactam and γ-butyrolactam; oxime compounds such as methyl ethyl ketoxime and cyclohexanoneoxime; phenolic compounds such as phenol, p-t-butylphenol and cresol; aliphatic alcohols such as n-butanol and 2-ethylhexanol; aromatic alcohol compounds such as phenylcarbitol and methylphenylcarbitol; and ether alcohol compounds such as ethylene glycol monobutyl ether.

Among them, oxime and lactam type blocking agents are dissociated at a relatively low temperature, and are hence preferred from the viewpoint of the low-temperature curability of the electrodeposition coating.

The proportions in which the base resin and the crosslinking agent are used may suitably be such that the former is used in an amount of 50 to 90% by weight and preferably 65 to 80% by weight, and the latter is used in an amount of 50 to 10% by weight and preferably 35 to 20% by weight, based on the combined solid weight of both ingredients.

The base resins of the self-crosslinking type having blocked isocyanate groups in the base resin molecule may be prepared, for example, by reacting the free isocyanate groups contained in a partially blocked polyisocyanate compound with the active hydrogen present in the base resin.

Moreover, these base resins have cationic groups which can be converted into cations by neutralization with an acid, such as primary, secondary or tertiary amino groups. Accordingly, they can be made soluble or dispersible in water, for example, by neutralization with a water-soluble organic acid such as formic acid, acetic acid or lactic acid.

Compound (B) Containing a Metal Selected From Among Bismuth, Lanthanum and Molybdenum This metal-containing compound (B) is useful for the purpose of enhancing the curability of the coating film formed from the cationic electrodeposition coating composition of the present invention and improving the anticorrosive properties thereof. Specifically, there may be used any of the compounds enumerated below for purposes of illustration. These compounds may be either water-soluble or water-insoluble.

Useful bismuth-containing compounds include, for example, bismuth lactate, bismuth silicate, triphenylbismuth, bismuth gallate, bismuth hydroxide, bismuth trioxide, bismuth nitrate, bismuth benzoate, bismuth citrate and bismuth oxycarbonate. Among others, bismuth lactate, bismuth silicate and bismuth hydroxide are preferred.

Useful lanthanum-containing compounds include, for example, lanthanum acetate, lanthanum lactate, lanthanum oxalate, lanthanum nitrate, lanthanum hydroxide, lanthanum oxide and lanthanum tungstate. Among others, lanthanum salts of organic acids such as lanthanum acetate are preferred.

Useful molybdenum-containing compounds include, for example, zinc molybdate, aluminum molybdate, zinc phosphomolybdate and aluminum phosphomolybdate. Among others, zinc molybdate and zinc phosphomolybdate are preferred.

These compounds may be used alone or in admixture of two or more. It is especially preferable to use bismuth-containing compounds.

The compound (B) may generally be used in powder form. Its average particle diameter is preferably not greater than 10 μm and more preferably in the range of 0.1 to 3 μm. The compound (B) is usually used in such an amount as to give 0.1 to 10 parts by weight, preferably 0.3 to 7.5 parts by weight, and more preferably 0.5 to 5 parts by weight, of metal per 100 parts by weight (on a solid basis) of the resin for cationic electrodeposition coatings (A).

Metal Hydroxide (C)

The metal hydroxide (C) used in the electrodeposition coating composition of the present invention comprises one or more compounds selected from among the compounds represented by the following formula. This compound is useful for the purpose of enhancing the curability of the resulting coating film and improving the anticorrosive properties thereof.

$$M_{(1-x)}Al_x(OH)_{(2+x)} \cdot mH_2O$$

wherein M is Mg or Zn, and x and m are values satisfying the relationships: $0 \leq x \leq 1$ and $0 \leq m < 2$, respectively.

This compound (C) is known per se, and examples thereof include those represented by the following formulae:

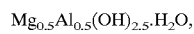

$$Mg_{0.5}Al_{0.5}(OH)_{2.5} \cdot H_2O,$$

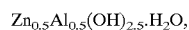

$$Zn_{0.5}Al_{0.5}(OH)_{2.5} \cdot H_2O,$$

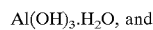

$$Al(OH)_3 \cdot H_2O, \text{ and}$$

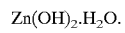

$$Zn(OH)_2 \cdot H_2O.$$

These compounds may be used alone (i.e., as a single compound) or as a mixture or complex of two or more compounds.

The compound (C) also comprehends compounds formed by substituting $CO_3^{2-}$ for part of OH in the compounds represented by the above formulae.

The compound (C) may generally be used in the form of a particulate material, powder or slurry. Its average particle diameter may be not greater than 50 μm, preferably in the range of 0.01 to 10 μm, and more preferably in the range of 0.1 to 3 μm. The compound (C) is usually used in an amount of 0.5 to 20 parts by weight, preferably 0.75 to 15 parts by weight, and more preferably 1 to 10 parts by weight, per 100 parts by weight (on a solid basis) of the resin for cationic electrodeposition coatings (A).

Cationic Electrodeposition Coating Composition

The cationic electrodeposition coating composition of the present invention may be prepared by mixing and dispersing the aforesaid resin for cationic electrodeposition coatings (A), metal-containing compound (B) and metal hydroxide (C) in an aqueous medium. Moreover, if necessary, the cationic electrodeposition coating composition of the present invention may further contain one or more coating additives such as coloring pigments, extender pigments, rust-preventive pigments, organic solvents and anti-settling agents which are commonly incorporated in coating compositions and the like.

Useful coloring pigments include, for example, inorganic and organic pigments such as titanium white, zinc white, carbon black, molybdate orange, red oxide, naphthol pigments, pyrazolone pigments, benzimidazolone pigments, anthraquinone pigments, thioindigo pigments, perylene pigments, quinacridone pigments, titanium yellow, monoazo pigments, disazo pigments, condensed azo pigments, anthrapyrimidine pigments, cobalt green, phthalocyanine green, ultramarine blue, cobalt blue, phthalocyanine blue and cobalt violet.

Useful extender pigments include, for example, calcium carbonate, kaolin, clay, diatomaceous earth, hydrated silica, talc, barytes, barium sulfate, barium carbonate, silica sand, glass beads and mica.

Useful rust-preventive pigments include, for example, zinc dust, zinc phosphate, calcium phosphate, aluminum phosphate, aluminum polyphosphates (e.g., aluminum tripolyphosphate), aluminum orthophosphate, calcium orthophosphate, borate-based rust-preventive pigments, compound oxides composed of iron oxide and one or more oxides selected from among alkaline earths and zinc oxide, tungstate-based rust-preventive pigments, phosphite-based rust-preventive pigments, hypophosphite-based rust-preventive pigments, nitrite-based rust-preventive pigments and vanadate-based rust-preventive pigments. Moreover, such compounds as $Zr(OH)_4$, $Mg_4Al_2(OH)_{12}CO_3.3H_2O$, $Mg_6Al_2(OH)_{16}CO_3.5H_2O$ and $Mg_6Al_7(OH)_{16}CO_3.4H_2O$ may also be used as rust-preventive pigments.

These coloring pigments, extender pigments and rust-preventive pigments may generally be used in powder form. Their average particle diameters are preferably not greater than 15 μm and more preferably in the range of 0.01 to 5 μm. These pigments are compounded in an amount which can be arbitrarily chosen according to the intended purpose. However, their amount compounded is usually in the range of 0.5 to 50 parts by weight, preferably 0.75 to 40 parts by weight, and more preferably 1 to 30 parts by weight, per 100 parts by weight (on a solid basis) of the resin for cationic electrodeposition coatings (A).

The cationic electrodeposition coating composition of the present invention may be prepared by mixing and dispersing the aforesaid resin for cationic electrodeposition coatings (A), compound (B) and metal hydroxide (C), together with coloring pigments, extender pigments, rust-preventive pigments (these three types of additives will hereinafter be referred to generically as "pigments"), organic solvents, anti-settling agents and other additives which are used as required, in an aqueous medium. Although no particular limitation is placed on the method of mixing these ingredients, several specific examples of the mixing method are described below.

a) An emulsion of the resin for cationic electrodeposition coatings (A) is mixed with an aqueous paste formed from the metal-containing compound (B) and the metal hydroxide (C), together with pigments and other additives which are used as required. After the addition of water, the ingredients are dispersed therein.

b) An emulsion of the resin for cationic electrodeposition coatings (A) which contains the metal-containing compound (B) is mixed with an aqueous paste formed from the metal hydroxide (C), together with pigments and other additives which are used as required. After the addition of water, the ingredients are dispersed therein.

c) One or more ingredients selected from the metal-containing compound (B), the metal hydroxide (C) and pigments are dispersed in water to form a slurry having a solid content of about 5 to 20% by weight. This slurry is mixed the remaining metal-containing compound (B), metal hydroxide (C) or pigments. (If all of these ingredients are formed into a slurry, this step may be omitted.) Thereafter, these ingredients are compounded into the resin for cationic electrodeposition coatings (A).

d) The metal hydroxide (C) is deposited on the surfaces of particles of the metal-containing compound (B), and these ingredients are mixed with pigments (which may be formed into a slurry) as required. Thereafter, these ingredients are compounded into the resin for cationic electrodeposition coatings (A).

e) The metal hydroxide (C) is deposited on the surfaces of particles of pigments, and these ingredients are mixed with the metal-containing compound (B) (which may be formed into a slurry). Thereafter, these ingredients are compounded into the resin for cationic electrodeposition coatings (A).

f) The metal hydroxide (C) is deposited on the surfaces of particles of the metal-containing compound (B) and pigments. Thereafter, these ingredients are compounded into the resin for cationic electrodeposition coatings (A).

Among others, the methods d), e) and f) are especially preferred.

The method for depositing the metal hydroxide (C) on (or applying it to) the surfaces of particles of the metal-containing compound (B) and/or pigments may be carried out, for example, by dispersing the metal-containing compound (B) and/or the pigments in a solvent mixture composed of a water-miscible organic solvent (e.g., a lower alcohol of 1 to 8 carbon atoms) and deionized water, dissolving the metal hydroxide (C) in this dispersion so as to form an intimate mixture, and then evaporating the solvent to dryness.

Alternatively, the metal-containing compound (B) and/or pigments are mixed with an aqueous solution of aluminum hydroxide represented by the above chemical formula for the ingredient (C) which has been adjusted to pH 5–9. (Its concentration of suitably in the range of 0.1 to 80% by weight and preferably 1 to 60% by weight.) If this mixture is allowed to stand at 20–80° C., a gel of aluminum hydroxide as the ingredient (C) is precipitated and deposited on the surface of particles of the metal-containing compound (B) and/or the pigments. Thereafter, the particles are classified as required, washed with water, purified, and dried to obtain the particles of the metal-containing compound (B) and/or the pigments which are coated with aluminum hydroxide.

An electrodeposition bath may be prepared by diluting the cationic electrodeposition coating composition of the present invention with deionized water or the like so as to give a solid content of about 5 to 40% by weight, and adjusting it to a pH of 5.5 to 9.0. Then, an electrodeposition coating process may be carried out by immersing an article to be coated in the electrodeposition bath, connecting it as the cathode, and passing an electric current under operating conditions including a bath temperature of about 15 to about 35° C. and a load voltage of about 100 to about 400 V. In this process, the thickness of the coating film is usually in the range of 10 to 40 μm as measured in its cured state. After completion of the passage of an electric current, the article is withdrawn from the electrodeposition bath, washed with water, and heated at a temperature of about 100 to about 200° C. for a time of about 10 to about 40 minutes to cure the coating film.

The above-described cationic electrodeposition coating composition of the present invention can produce the following effects.

1) By using the cationic electrodeposition coating composition of the present invention, a coating film exhibiting an excellent rust-proofing effect on untreated steel plates or sheets can be formed without using harmful substances such as lead compounds and chromium compounds.

2) The coating film formed from the cationic electrodeposition coating composition of the present invention has an attractive appearance characterized by good smoothness, gloss and the like.

3) The coating film formed from the cationic electrodeposition coating composition of the present invention shows no reduction in such properties as anticorrosive power and adhesion, even if it is exposed to high temperatures above 200° C. within a heating oven for curing it.

EXAMPLES

The present invention is more specifically explained with reference to the following examples and comparative examples. However, these examples are not to be construed to limit the scope of the invention. Unless otherwise stated, all parts and percentages are by weight.

1. Preparation of Samples

1) Emulsions for Cationic Electrodeposition Coatings (a) 1,900 parts of "Epon 1004" (manufactured by Yuka Shell Co., Ltd.; trade name; bisphenol A type epoxy resin; epoxy equivalent about 950) was dissolved in 1,012 parts of butyl cellosolve. After this solution was heated to 80–100° C., 124 parts of diethylamine was added dropwise thereto. The resulting mixture was held at 120° C. for 2 hours to obtain an amine-added epoxy resin having an amine value of 47. Next, 1,000 parts of a dimer acid type polyamide resin having an amine value of 100 ("Versamide 460", manufactured by Henkel Hakusui Corp.; trade name) was dissolved in 429 parts of methyl isobutyl ketone. This solution was heated under reflux at 130–150° C., during which the formed water was distilled off. The resulting product in which the terminal amino groups of the amide resin had been converted into ketimine groups was held at 150° C. for about 3 hours, and cooled to 60° C. after the distillation of water ceased. Subsequently, this product was added to the above amine-added epoxy resin. The resulting mixture was heated to 100° C., held at that temperature for 1 hour, and then cooled to room temperature. Thus, there was obtained an amine-added epoxy resin-modified polyamide resin varnish having a solid content of 68% and an amine value of 65.

To 103 parts (70 parts on a solid basis) of this varnish were added 30 parts (on a solid basis) of 2-ethylhexyl alcohol-blocked tolylene diisocyanate, 15 parts of a 10% aqueous solution of acetic acid, and 20 parts of a 10% aqueous solution of bismuth lactate. After intimate mixing, 150 parts of deionized water was added dropwise to the vigorously stirred mixture over a period of about 15 minutes. Thus, there was obtained an emulsion for cationic electrodeposition coatings (a) having a solid content of 34%.

(b) To 103 parts (70 parts on a solid basis) of the amine-added epoxy resin-modified polyamide resin varnish (having a solid content of 68%) described above in (a) were added 30 parts (on a solid basis) of 2-ethylhexyl alcohol-blocked tolylene diisocyanate and 15 parts of a 10% aqueous solution of acetic acid. After intimate mixing, 150 parts of deionized water was added dropwise to the vigorously stirred mixture over a period of about 15 minutes. Thus, there was obtained an emulsion for cationic electrodeposition coatings (b) having a solid content of 34%.

2) Dispersed Pigment Pastes

The ingredients shown in Table 1 below were charged into a ball mill, and subjected to a dispersion treatment for 40 hours. Thus, there were obtained dispersed pigment pastes having a solid content of 55%.

In Table 1, (Note 1) to (Note 8) have the respective meanings described below.

(Note 1) "75% resin solution": An aqueous solution having a solid content of 75% which is obtained by reacting a fatty acid-modified epoxy resin with diethanolamine and neutralizing the reaction product with acetic acid.
(Note 2) Compound (B)-a: $Bi(OH)_3$.
(Note 3) Compound (B)-b: $ZnMoO_4$.
(Note 4) Compound (B)-c: $La(CH_3COO)_3$.
(Note 5) Compound (C)-a: $Mg_{0.5}Al_{0.5}(OH_{2.5}.(CO_3)_{0.25}.H_2O$.
(Note 6) Compound (C)-b: $Al(OH)_3.H_2O$.
(Note 7) Compound (C)-c: $Al(OH)_3$.
(Note 8) Compound (C)-d: $Zn(OH)_2$.

TABLE 1

| Dispersed pigment paste | | a | b | c | d | e | f | g | h | i | j |
|---|---|---|---|---|---|---|---|---|---|---|---|
| 75% resin solution (Note 1) | | 17 | 17 | 17 | 17 | 17 | 17 | 17 | 17 | 17 | 17 |
| Acetic acid | | 1 | 1 | 1 | 1 | 1 | 1 | 1 | 1 | 1 | 1 |
| Compound (B) | a) (Note 2) | | | | | | | | | | 4 |
| | b) (Note 3) | | | | | | | 4 | | | |
| | c) (Note 4) | | | | | | | | 4 | | |
| Compound (C) | a) (Note 5) | 4 | 17 | 14 | | | | 4 | 4 | | |
| | b) (Note 6) | | | | 7 | | | | | | |
| | c) (Note 7) | | | | | 7 | | | | | |
| | d) (Note 8) | | | | | | 7 | | | | |
| Titanium white pigment | | 30 | 26 | 19 | 26 | 26 | 26 | 26 | 26 | 33 | 30 |
| Carbon black | | 1 | 1 | 1 | 1 | 1 | 1 | 1 | 1 | 1 | 1 |
| Dioctyltin oxide | | 3 | 3 | 3 | 3 | 3 | 3 | 3 | 3 | 3 | 3 |
| Deionized water | | 44 | 45 | 45 | 45 | 45 | 45 | 44 | 44 | 45 | 44 |
| Total | | 100 | 100 | 100 | 100 | 100 | 100 | 100 | 100 | 100 | 100 |

2. Examples 1–8 and Comparative Examples 1–2

One of the dispersed pigment pastes (a) to (j) shown in Table 1 was added to the above-described emulsion for cationic electrodeposition coatings (a) or (b). This mixture was diluted with deionized water to prepare a cationic electrodeposition coating bath having a solid content of 20%. The compositions of the cationic electrodeposition coating baths so prepared are shown in Table 2 below.

Degreased cold-rolled dull steel sheets (measuring 0.8 mm×150 mm×70 mm) which had not been subjected to any chemical conversion treatment were immersed in each cationic electrodeposition coating bath, connected as the cathode, electrodeposition-coated at a voltage of 300 V to a coating thickness of 20 μm, washed with water, and heated to cure the coating film. The heating was carried out using an electric hot-air oven at 170° C., 200° C. or 220° C. for 20 minutes at each temperature.

The performance tests of the resulting cured electrodeposition coating films were carried out according to the following procedures. The results thus obtained are also shown in Table 2 below. In the "Anticorrosive power 1" and "Anticorrosive power 2" columns of Table 2, "170° C.", "200° C." and "220° C." refer to the test results for the coating films cured at the respective temperatures.

Anticorrosive power 1: The coated sheet having a coating film cured at each temperature was soaked in a 5% aqueous solution of sodium chloride at 50° C. for 480 hours, washed with water, and dried. After a cut was made in the coating film, a strip of adhesive cellophane tape was attached to the cut region and then peeled quickly. By observing the coated surface, the percentage of the area of the detached coating film based on the area of the attached adhesive cellophane tape was determined. "○", "Δ" and "×" indicate that the area of the detached coating film is in the range of 0 to 10%, 10 to 20%, and greater than 20%, respectively.

Anticorrosive power 2: With respect to the coated sheet having a coating film cured at each temperature, a crosscut was made in the coating film with a knife so as to reach the underlying steel surface. Then, according to JIS Z-2371, the coated sheet was subjected to a salt spray test for 480 hours. Thereafter, the width (mm) of rust and blister starting from the cut was measured.

Smoothness of coated surface: With respect to the coated sheet having a coating film cured by heating an electrodeposited coating film at 170° C. for 20 minutes in an electric hot-air oven, the surface of the coating film was observed visually. "○" indicates that the surface has essentially no craters or blisters and presents a good appearance; "Δ" indicates that the surface has some craters or blisters and presents a rather poor appearance; and "×" indicates that the surface has many craters or blisters and presents a poor appearance.

hand, 4 parts of $Al(OH)_3.H_2O$ was mixed with and uniformly dispersed in 17 parts of water to form a slurry (ii). After the total amounts of these slurries (i) and (ii) were mixed in a ball mill, 17 parts of "75% resin solution" (Note 1), 1 part of acetic acid, 22 parts of titanium white pigment, 1 part of carbon black, and 3 parts of dioctyltin oxide were charged thereinto, and these ingredients were subjected to a dispersion treatment for 40 hours. Thus, there was obtained a pigment paste (k) having a solid content of 55%. Then, 500 parts of the emulsion for cationic electrodeposition coatings (b) was mixed with 100 parts of the pigment paste (k), and this mixture was diluted with deionized water to prepare a cationic electrodeposition coating bath having a solid content of 20%.

Degreased cold-rolled dull steel sheets (measuring 0.8 mm×150 mm×70 mm) which had not been subjected to any chemical conversion treatment were immersed in the above cationic electrodeposition coating bath, connected as the cathode, electrodeposition-coated at a voltage of 300 V to a coating thickness of 20 μm, washed with water, and heated to cure the coating film. The heating was carried out using an electric hot-air oven at 170° C., 200° C. or 220° C. for 20 minutes at each temperature. The resulting cured electrodeposition coating films were subjected to performance tests. The results thus obtained are shown in Table 3 below. The procedures for these performance tests were the same as described previously.

3. Example 10

26 parts of titanium white pigment was mixed with and uniformly dispersed in 27 parts of water to form a slurry (iii). After the total amount of this slurry (iii) and the total amount of the aforesaid slurry (ii) (formed by dispersing 7 parts of $Al(OH)_3.H_2O$ uniformly in 28 parts of water) were mixed in a ball mill, 17 parts of "75% resin solution" (Note 1), 1 part of acetic acid, 1 part of carbon black, and 3 parts of dioctyltin oxide were charged thereinto, and these ingredients were subjected to a dispersion treatment for 40 hours. Thus, there was obtained a pigment paste (m) having a solid content of 55%. Then, 500 parts of the emulsion for cationic electrodeposition coatings (a) was mixed with 100 parts of

TABLE 2

|  |  | Example | | | | | | | | Comparative Example | |
|---|---|---|---|---|---|---|---|---|---|---|---|
|  |  | 1 | 2 | 3 | 4 | 5 | 6 | 7 | 8 | 1 | 2 |
| Emulsion | | | | | | | | | | | |
| Designation | | a | a | a | a | a | a | b | b | a | b |
| Amount | | 500 | 500 | 500 | 500 | 500 | 500 | 500 | 500 | 500 | 500 |
| Pigment paste | | | | | | | | | | | |
| Designation | | a | b | c | d | e | f | g | h | i | j |
| Amount | | 100 | 100 | 100 | 100 | 100 | 100 | 100 | 100 | 100 | 100 |
| Performance of coating film | | | | | | | | | | | |
| Anticorrosive | 170° C. | ○ | ○ | ○ | ○ | ○ | ○ | ○ | ○ | ○ | Δ |
| power 1 | 200° C. | ○ | ○ | ○ | ○ | ○ | ○ | ○ | ○ | Δ | X |
|  | 220° C. | ○ | ○ | ○ | ○ | ○ | ○ | ○ | ○ | X | X |
| Anticorrosive | 170° C. | 3.6 | 3.6 | 3.4 | 3.5 | 3.8 | 3.8 | 3.6 | 3.7 | 4.2 | 3.8 |
| power 2 | 200° C. | 4.1 | 4.0 | 3.6 | 4.0 | 4.1 | 4.0 | 4.1 | 4.1 | 4.5 | 4.6 |
|  | 220° C. | 5.0 | 4.8 | 4.4 | 4.3 | 4.8 | 5.0 | 4.9 | 5.1 | 10.2 | 11.8 |
| Smoothness | | ○ | ○ | ○ | ○ | ○ | ○ | ○ | ○ | ○ | ○ |

3. Example 9

7 parts of $Bi(OH)_3$ was mixed with and uniformly dispersed in 28 parts of water to form a slurry (i). On the other the pigment paste (m), and this mixture was diluted with deionized water to prepare a cationic electrodeposition coating bath having a solid content of 20%.

Degreased cold-rolled dull steel sheets (measuring 0.8 mm×150 mm×70 mm) which had not been subjected to any chemical conversion treatment were immersed in the above cationic electrodeposition coating bath, connected as the cathode, electrodeposition-coated at a voltage of 300 V to a coating thickness of 20 μm, washed with water, and heated to cure the coating film. The heating was carried out using an electric hot-air oven at 170° C., 200° C. or 220° C. for 20 minutes at each temperature. The resulting cured electrodeposition coating films were subjected to performance tests. The results thus obtained are shown in Table 3 below. The procedures for these performance tests were the same as described previously.

TABLE 3

| | Example | |
|---|---|---|
| | 9 | 10 |
| Anticorrosive power 1 | | |
| 170° C. | ○ | ○ |
| 200° C. | ○ | ○ |
| 220° C. | ○ | ○ |
| Anticorrosive power 2 | | |
| 170° C. | 3.4 | 3.4 |
| 200° C. | 3.8 | 3.9 |
| 220° C. | 4.0 | 4.1 |
| Smoothness | ○ | ○ |

What is claimed is:

1. A cationic electrodeposition coating composition comprising (A) a resin for cationic electrodeposition coatings which has been obtained by neutralizing a cationic group-containing base with a water-soluble organic acid; and (B) a compound containing a metal selected from the group consisting of bismuth, lanthanum and molybdenum, and (C) a metal hydroxide represented by the following formula:

wherein M is Mg or Zn, and x and m are values satisfying the relationships: $0 \leq x \leq 1$ and $0 \leq m \leq 2$.

2. The composition as claimed in claim 1 wherein the resin for cationic electrodeposition coatings (A) is an amine-added epoxy resin.

3. The composition as claimed in claim 1 wherein the metal-containing compound (B) is selected from the group consisting of bismuth lactate, bismuth silicate, triphenylbismuth, bismuth gallate, bismuth hydroxide, bismuth trioxide, bismuth nitrate, bismuth benzoate, bismuth citrate, bismuth oxycarbonate, lanthanum acetate, lanthanum lactate, lanthanum oxalate, lanthanum nitrate, lanthanum hydroxide, lanthanum oxide, lanthanum tungstate, zinc molybdate, aluminum molybdate, zinc phosphomolybdate and aluminum phosphomolybdate.

4. The composition as claimed in claim 1 wherein the metal-containing compound (B) is selected from the group consisting of bismuth lactate, bismuth silicate, bismuth hydroxide, lanthanum acetate, zinc molybdate and aluminum phosphomolybdate.

5. The composition as claimed in claim 1 wherein the metal-containing compound (B) is in the form of a powder having an average particle diameter of not greater than 10 μm.

6. The composition as claimed in claim 1 wherein the metal-containing compound (B) is present in such an amount as to give 0.1 to 10 parts by weight of metal per 100 parts by weight (on a solid basis) of the resin for cationic electrodeposition coatings (A).

7. The composition as claimed in claim 1 wherein the metal-containing compound (B) is present in such an amount as to give 0.5 to 5 parts by weight of the metal per 100 parts by weight (on a solid basis) of the resin for cationic electrodeposition coatings (A).

8. The composition as claimed in claim 1 wherein the metal hydroxide (C) is selected from the group consisting of $Mg_{0.5}Al_{0.5}(OH)_{2.5} \cdot H_2O$, $Zn_{0.5}Al_{0.5}(OH)_{2.5} \cdot H_2O$, $Al(OH)_3 \cdot H_2O$, $Zn(OH)_2 \cdot H_2O$, mixtures thereof and complexes thereof.

9. The composition as claimed in claim 1 wherein the metal hydroxide (C) is in the form of a particulate material, powder or slurry having an average particle diameter of not greater than 50 μm.

10. The composition as claimed in claim 1 wherein the metal hydroxide (C) is present in an amount of 0.5 to 20 parts by weight per 100 parts by weight (on a solid basis) of the resin for cationic electrodeposition coatings (A).

11. The composition as claimed in claim 1 wherein the metal hydroxide (C) is present in an amount of 1 to 10 parts by weight per 100 parts by weight (on a solid basis) of the resin for cationic electrodeposition coatings (A).

12. The composition as claimed in claim 1 which further comprises a pigment selected from the group consisting of coloring pigments, extender pigments and rust-preventive pigments.

13. The composition as claimed in claim 1 wherein the metal hydroxide (C) is present in a state deposited on the surfaces of particles of the metal-containing compound (B) and/or the pigment.

14. An electrodeposition bath comprising the cationic electrodeposition coating composition of claim 1.

15. A method for the electrodeposition coating of untreated steel plates or sheets which comprises using the electrodeposition bath of claim 14.

16. An article electrodeposition-coated by using the cationic electrodeposition coating composition of claim 1.

17. The composition as claimed in claim 12 wherein the metal hydroxide (C) is present in a state deposited on the surfaces of particles of the metal-containing compound (B) and/or the pigment.

* * * * *